(No Model.)
J. E. EMERSON.
REVERSIBLE SAW TOOTH.
No. 368,999. Patented Aug. 30, 1887.
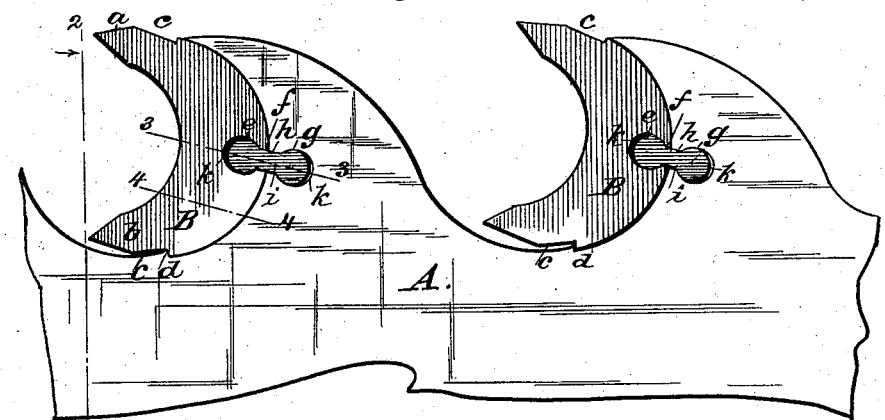
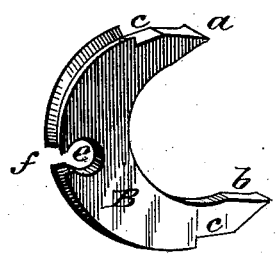
Witnesses
Fred G. Dieterich
Wm E. Dyre
Inventor
J. E. Emerson
By his Attorneys
Johnston, Reinohl & Dyre

UNITED STATES PATENT OFFICE.

JAMES E. EMERSON, OF BEAVER FALLS, PENNSYLVANIA.

REVERSIBLE SAW-TOOTH.

SPECIFICATION forming part of Letters Patent No. 368,999, dated August 30, 1887.

Application filed May 4, 1887. Serial No. 237,128. (No model.)

*To all whom it may concern:*

Be it known that I, JAMES E. EMERSON, a citizen of the United States, residing at Beaver Falls, in the county of Beaver and State of Pennsylvania, have invented certain new and useful Improvements in Reversible Saw-Teeth; and I do hereby declare the following to be a full, clear, and exact description of the invention, such as will enable others skilled in the art to which it appertains to make and use the same.

My invention relates to reversible saw-teeth and means for securing them to a saw plate or body.

Under the prevailing constructions of attachable saw-teeth they are secured to the plate by rivets, keys, or wedges, and in applying said devices the saw is expanded or enlarged at the rim or cutting-edge, which necessitates hammering or what saw-makers term "opening" the saw in the center to compensate for the riveting, wedging, or keying of the saw-plate at or near the rim. The teeth are also of the same thickness throughout. This requires setting of the teeth to provide for the cutting of a kerf that will clear the saw plate or body to prevent heating.

It is my purpose to obviate the objectionable features of construction enumerated and to produce reversible saw-teeth in which there are two cutting portions, one of which is wider or thicker than the other, and means for securing the teeth to the saw-plate without expanding the rim of the plate.

The invention will be hereinafter described, and particularly pointed out in the claims.

In the accompanying drawings, which form a part of this specification, Figure 1 represents a side view of a section of a saw-plate with my reversible teeth attached; Fig. 2, a section on line 2 2 of Fig. 1; Figs. 3 and 4, sections on lines 3 3 and 4 4; and Figs. 5 and 6 are details of a tooth and the yoke for securing it to a saw-plate.

Reference being had to the drawings and the letters marked thereon, A represents the plate or body of a saw, which is provided with circular recesses or sockets to receive the saw-tooth.

B represents the reversible tooth, which is provided with a circular body portion, which conforms to the recesses in the plate A and two cutting portions, $a\ b$. The former, which is shown in working position, is made thicker at the ends than the portion marked $b$, so as to cut a kerf that will clear $b$ and the body of the saw. The portion $b$ in turn is made slightly thicker at its ends than the body of the tooth B and the saw body or plate A for the same purpose—that is, clearing the body of the tooth and the saw-plate. In the rear edge of the body of the tooth B is formed a V-shaped groove which engages with a corresponding projection on the saw-plate to hold the tooth against lateral displacement.

At each end of the grooved part of the tooth is formed a rabbet, $c$, one of which engages with a projection or shoulder, $d$, on the plate A in either position that the tooth B may be attached to the plate. In the body of the tooth B is formed a cylindrical aperture, $e$, with a slot, $f$, connecting with it, and in the plate A are formed corresponding apertures, $g$, and slots $h$, to receive a yoke, $i$, for attaching the tooth to the plate.

To secure the drawing action of the yoke $i$ upon the tooth B, the apertures $e$ and $g$ are made slightly larger than the cylindrical portions of the yoke $i$ and afford a clearance-space, $k$, as shown in Figs. 1 and 3, while the shoulders on the yoke and the inner walls of the apertures $e$ and $g$ are brought up tight and firm. By this construction the wedging or keying action heretofore so objectionable (for the reasons stated) is entirely overcome and the tooth held in its seat without expanding the rim of the saw in the least appreciable degree.

The apertures $e$ and $g$ and the ends of the yoke $i$ are not limited to the form shown, as others may easily be applied without departing from the spirit of my invention. They may be made lozenge-shaped or of other angular form.

The tooth B may be made of various sizes and thickness, according to the uses to which it is to be applied.

In the practical use of the tooth it is first attached to the saw-plate A, with the thick cutting portion $a$ in working position, and the apertures $e\ g$ and their slots $f\ h$ made to register, when the yoke $i$ is driven into said apertures and slots, completely filling them (except at the outer ends of the yoke) and drawing the tooth firmly upon the V-shaped projection on the saw-plate. The yoke $i$ being of the same thickness as the plate A, it is driven into the plate and tooth until its sides are flush with or in the plane of the plate and the tooth. After the cutting portion $a$ has become dull and its end worn to the thickness of the end of the portion $b$, the yoke $i$ is driven out and the tooth reversed by setting the cutting portion $b$ in working position on the plate A, when the yoke $i$ is again inserted and the saw is ready for use.

Having thus fully described my invention, what I claim is—

1. A reversible saw-tooth having a circular body provided with an aperture near its center and cutting portions or teeth of different thicknesses at its ends, both of the teeth being thicker than the body portion, substantially as described.

2. A reversible saw-tooth having a circular body and cutting portion or teeth at its ends, in combination with a saw-plate having circular recesses to receive said tooth, a detachable yoke, and clearance-spaces at the ends of the yoke, substantially as and for the purpose set forth.

3. A reversible saw-tooth having a circular body, cutting portions or teeth at its ends, and rabbets adjacent to the teeth, in combination with a saw-plate having circular recesses and provided with a projection or shoulder to engage with one of the rabbets on the tooth, a detachable yoke, and clearance-spaces at the ends of the yoke, substantially as described.

4. Reversible saw-teeth having a circular body, cutting portions or teeth at their ends, a cylindrical aperture, and a slot, in combination with a saw-plate having circular recesses, and cylindrical recesses and slots, and yokes conforming to the apertures and slots in the teeth and the saw-plate, the cylindrical portions of the yokes being slightly smaller than said apertures and affording clearance-space at the ends of the yokes, substantially as described.

In testimony whereof I affix my signature in presence of two witnesses.

JAMES E. EMERSON.

Witnesses:
J. F. MERRIMAN,
H. W. REEVES.